United States Patent [19]
Gwynn

[11] 4,345,817
[45] Aug. 24, 1982

[54] WIDE ANGLE DISPLAY DEVICE

[75] Inventor: Eric C. E. Gwynn, Hove, England

[73] Assignee: The Singer Company, Binghamton, N.Y.

[21] Appl. No.: 155,903

[22] Filed: Jun. 2, 1980

[30] Foreign Application Priority Data

Jan. 29, 1980 [GB] United Kingdom .............. 8003002

[51] Int. Cl.³ .............................................. G02B 27/14
[52] U.S. Cl. ....................................... 350/174; 358/87
[58] Field of Search .............. 350/171, 174, 293; 35/12 R, 12 BL, 12 N; 89/41 R; D19/60; D96/12; 358/87, 238, 239

[56] References Cited

U.S. PATENT DOCUMENTS

| | | | |
|---|---|---|---|
| 3,291,905 | 12/1966 | Smith | 358/87 |
| 3,659,920 | 5/1972 | McGlasson | 358/87 |
| 3,709,581 | 1/1973 | McGlasson | 358/87 |
| 4,060,835 | 11/1977 | Gdovin | 35/12 N |

*Primary Examiner*—Jon W. Henry
*Attorney, Agent, or Firm*—Jeff Rothenberg; Douglas M. Clarkson

[57] ABSTRACT

In order to widen the field-of-view, two display devices are abutted. A first display device has a concave mirror (10), a 45° beam splitter (12) and a CRT positioned on an axis (16). To minimize any gap tending to develop between adjacent images, a second display device is rotated 90° about its viewing axis (24), the second display device having a concave mirror (20), a beam splitter (22) and a CRT (21). The CRT axis (26) is tilted towards the mirror (20) to provide image continuity where the devices abut, so that eye movement within a range to an observer's right of the center of curvature (18) is possible without any gap developing between two displayed images. In a modification, the mirror (20) has a larger radius of curvature and overlaps the mirror (10). In an alternative arrangement, there is no 90° rotation of the second display device, but the CRT axes are tilted towards each other.

10 Claims, 5 Drawing Figures

WIDE ANGLE DISPLAY DEVICE

BACKGROUND OF THE INVENTION

The present invention generally, relates to visual display arrangements for a simulator to develop improved realism and, more particularly, to wide angle display devices of the type in which the screen of a Cathode Ray Tube (CRT) is reflected into a concave mirror by a beam splitter, through which an observer sees the image of the CRT screen in the mirror.

Such devices are sometimes known as WAC heads (wide angle collimated heads) and commonly have the beam splitter inclined upwardly and away from the lower edge of the mirror, i.e., towards the observer, and the CRT is commonly mounted with its tube axis vertical and with its screen facing down, over the beam splitter.

These devices are used to display out-of-the-window screens in the cockpit of a flight simulator. Situations arise in such simulators today in which a substantially wider field-of-view is desired than a single device can provide, which typically is about 45°. If two wide angle display devices are mounted side by side, it has been impossible to avoid an obvious gap between them in the composite display, as a result of eye movement from the ideal viewing position.

An object of the present invention is to provide arrangements which overcome or compensate for such gaps and which allow the images of two CRT screens to be substantially continuous. If the images overlap, there may be a data overlap, which must be taken into account in generating the respective video signals for the two CRTs. The present invention is not concerned with this aspect of use of the arrangement which would involve correctly adjusting the geometry of the two video signals in the area of overlap of the two displays.

In describing the invention, the expression "device axis" is the axis containing the radius through the center of the mirror. Also, the expressions "device azimuth" and "device elevation" are used to mean angles from the device axis measured, respectively, as the $\theta$ and $\phi$ coordinates of conventional spherical polar coordinates referenced to a z-axis parallel to the CRT axis. The lateral edges of the mirror are at the maximum values of the device azimuth.

SUMMARY OF THE INVENTION

According to one aspect of the present invention, a wide angle display arrangement has first and second wide angle display devices, in each of which the screen of a CRT is reflected into a concave mirror by a beam splitter through which an observer sees the image of the CRT screen in the mirror, the mirrors of the two display devices being positioned contiguously to form a composite visual display, and the axis of one CRT is titled so that the CRT screen images appear to be continuous as observed in the concave mirrors.

In this embodiment of the invention, the substantially continuous image is achieved solely by the CRT axis tilt. The two display devices are orientated similarly with the right hand edge of the mirror for the first display device adjacent the left hand edge of the mirror for the second device.

In an alternative arrangement, the second display device is rotated 90° about its device axis relative to the first display device and has its device axis so displaced from the first device axis that the edge of the beam splitter in the second display device, which is adjacent the concave mirror in this second display device, is also adjacent a lateral edge of the concave mirror in the first display device.

The continuity of images is achieved then either solely by the tilt of the CRT axis of one display device or, additionally, the mirror of one display device has a larger radius of curvature and is physically overlapped by the mirror of the other display device. In this case, there is image overlap only when the eye moves off the ideal viewing position, because part of the CRT screen in the second display device is masked by the mirror in the first display device.

However, similar considerations arise in providing the video signals as discussed for the case of image overlap. Naturally, in all embodiments, there will be an observable discontinuity in the image created by beam splitter and/or mirror edges, but this will not increase with eye movement that is within a certain range.

In describing embodiments of the invention, only the optical arrangements will be considered. The mechanical supports for the mirrors, the CRTs and the beam splitters must be so arranged that they do not interfere with the image in particular and so that they are not visible in the region where the CRT screen images are joined.

THE DRAWINGS

The invention will be described in more detail by way of example, with reference to the accompanying drawings, in which.

DETAILED DESCRIPTION

Figure 1:
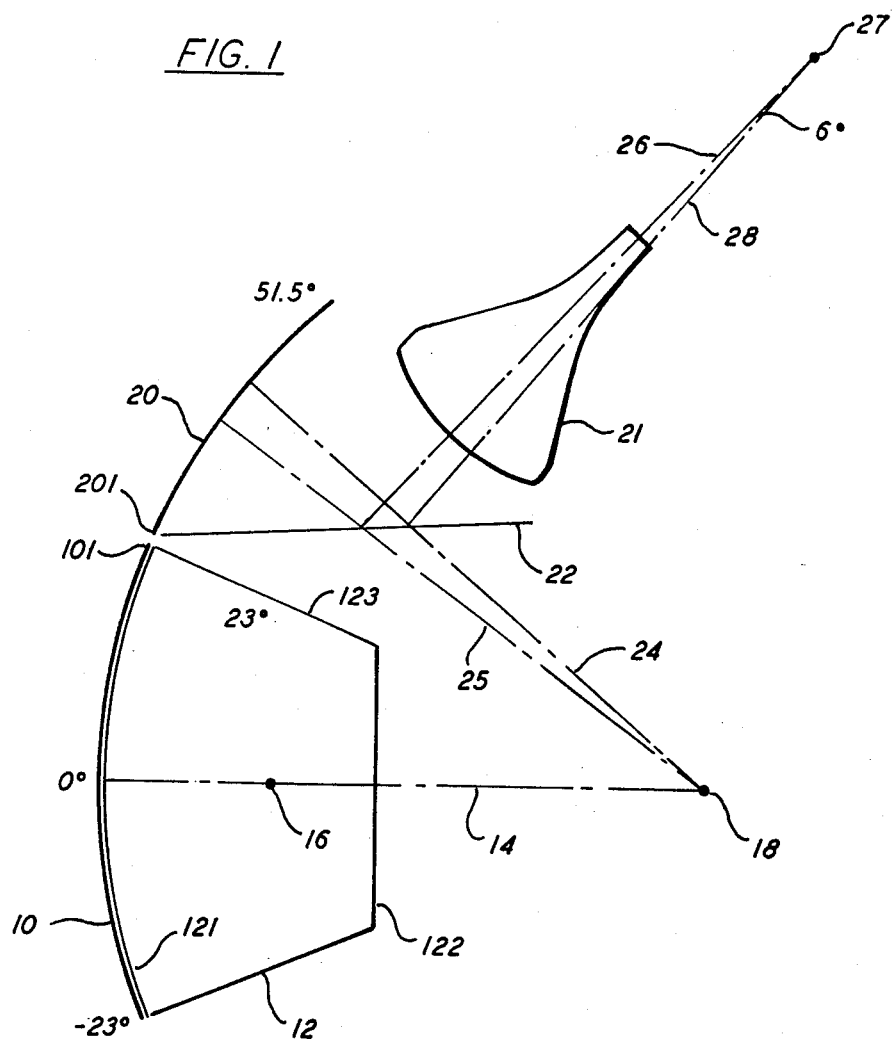
FIG. 1 is a plan view of a presently preferred form of the invention.

In FIG. 1 of the drawings, a first display device has a concave mirror 10 and a beam splitter 12 inclined at 45° to the device axis 14, for the purpose of this illustration. The bottom edge 121 of the beam splitter 12, which is a conventional half-silvered mirror, is contiguous with the bottom edge of the concave mirror 10; the top edge 122 of the beam splitter 12 is around the same level as the top edge of the concave mirror 10.

In practice, the top edge of the beam splitter 12 is slightly below the top edge of the mirror 10. The first Cathode Ray Tube (CRT) is not shown but this first CRT has a vertical tube axis 16 which is perpendicular to the plane of the drawing, and the screen of the first CRT faces down over the beam splitter 12. The concave mirror 10 has a radius of curvature of 127.5 centimeters (cm).

A second display device has a concave mirror 20, a beam splitter 22 and a CRT 21. The second display device is substantially identical to the first display device, but it has been rotated 90° clockwise about its device axis 24.

The CRT 21 has been tilted about the center of curvature 27 of the CRT screen so that the actual tube axis 26 is displaced about 6°, for example, from the nominal tube axis 28. The "bottom" edge 201 of the second concave mirror 20 abuts a lateral edge 101 of the first concave mirror 10, and the center of curvature of these two mirrors 10 and 20 coincide at a point 18.

The 6° tilt of the axis 26 for the CRT tube 21 is towards the concave mirror 20, which moves the effective axis 25 nearer to the mirror 10 than the nominal axis 24. It is in this way that continuity of the images is established, i.e., any gap between the two images is substantially illuminated. Although a greater degree of tilt is feasible, it is undesirable because of the reduction of overall field-of-view.

Device azimuth and elevation, as defined above, have been interchanged because of the 90° rotation of the second display device about its axis 24. It is necessary now, therefore, to relate all azimuth and elevation angles to the device axis 14 of the first display device. The significant azimuth angles are shown on FIG. 1.

Figure 2:
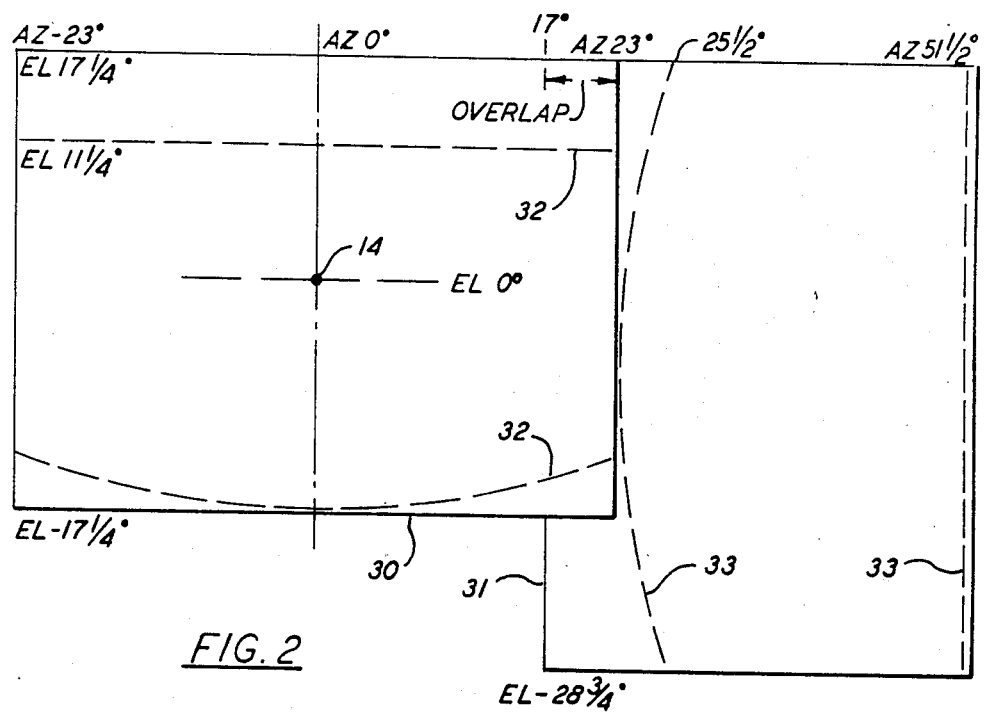
FIG. 2 is a front view in elevation of the invention with the eye positioned at the mirror center of curvature.

Referring to FIG. 2, the total fields-of-view (FOVs) 30 and 31 are shown in full line, whereas the instantaneous FOVs, which arise when the eye is at point 18, are shown in broken lines at 32 and 33. The "instantaneous" field-of-view is what the eye can see in a fixed position, whereas the "total" field-of-view is what can be seen with small movements of the eye position.

The 6° overlap of the total FOVs is apparent. It is also apparent that the device axis 24 of the second display device has also been depressed in elevation so as to align the top edges of the FOVs. Azimuth and elevation angles are denoted AZ and EL, respectively.

Figure 3:
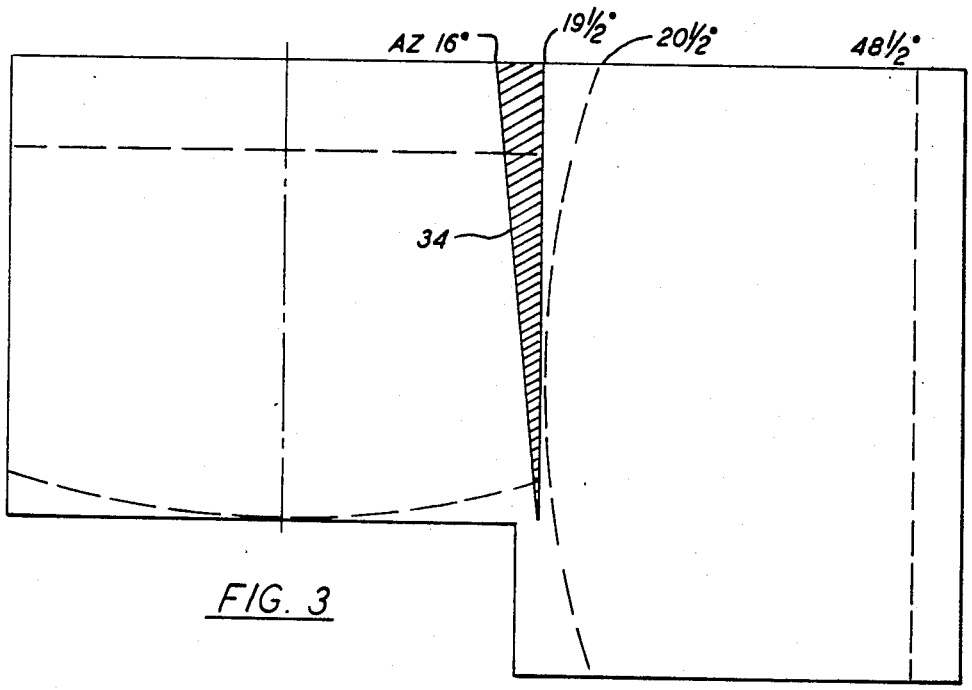
FIG. 3 is a view similar to FIG. 2 and illustrates the effects of lateral eye movement.

If the eye is moved from the point 18 to another point in FIG. 1 which is 7.5 cm to the right of the point 18, i.e., into the plane of the drawing, then the FOVs appear as shown in FIG. 3. A bright band 34, shown hatched, as illustrated, appears. This is because, over most of the FOV, light from either CRT is attenuated by:

(1) A reflection at a half silvered mirror,
(2) A reflection at a true mirror,
(3) Passage through a half silvered mirror.

The reflection and transmission factors involved in Items (1) and (3) above are about 50% each. When the eye moves to the right, a narrow wedge of the mirror 10 is seen past the edge of the beam splitter 12 without the attenuation of Item (3). Hence, the narrow wedge has approximately twice the luminous intensity as the rest of the FOV.

For the dimensions given in this embodiment, the eye can move up to 13 centimeters (cm) to the right with no worse effect than progressive widening of the bright band 34. Beyond 13 cm, a gap develops between the two FOVs 30 and 31.

A gap becomes visible with any movement to the left of the point 18 (from the plane of the drawing in FIG. 1). Therefore, the eye can be positioned anywhere within 13 cm of the point 18 for a gap to be visible (although discontinuities will be seen at the right edge 123 of the beam splitter 12 and where the mirrors 10 and 20 meet, i.e., edges 101 and 201 are contiguous). The 13 cm dimension is acceptable in practice even when binocular vision is considered with a typical eye separation of 5 cm.

There is always a narrow azimuth distance (about 1.5°) over which the left and right eyes receive information from the first and second CRTs, respectively. Therefore, it is important to ensure that the two CRT images have exactly the same geometry and linearity in the region where they are contiguous or overlap.

Figure 4:
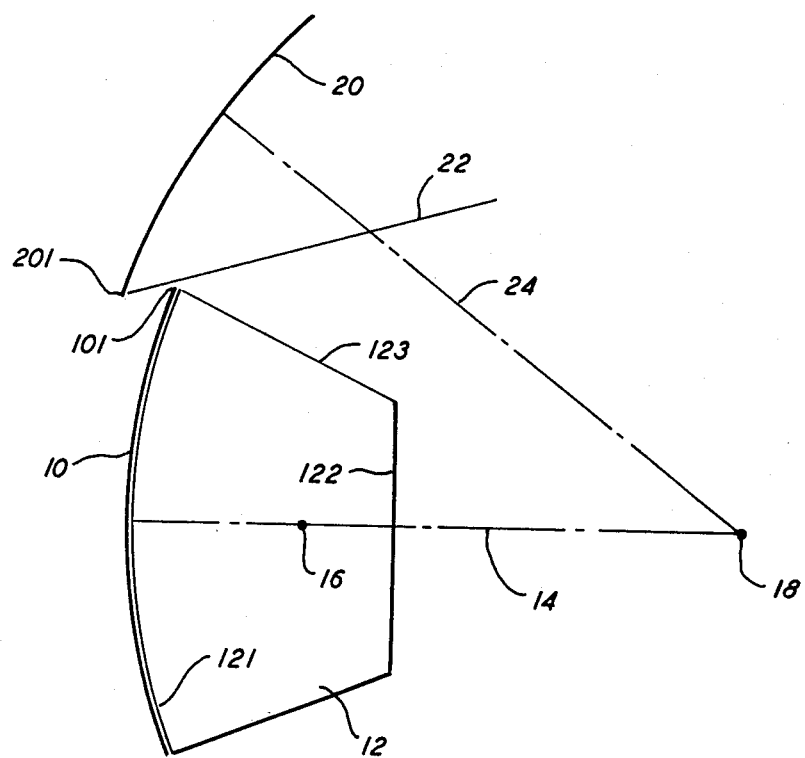
FIG. 4 is a plan view of another form of the invention showing an overlap in adjacent edges of the mirrors.

In the embodiment shown in FIG. 4, the same reference numerals are used as used in FIG. 1 to indicate the same or similar component parts, and the CRT 21 is omitted for simplicity. The radius of curvature of the mirror 20 has been increased (from 127.5 cm to 141 cm), and the second display device has been turned a little counterclockwise, so that the mirror 10 overlaps the left hand margin of the mirror 20 (and the corresponding part of the beam splitter 22). The amount of the overlap is 2.5°.

The FOV appearances are the same, generally, as shown in FIGS. 2 and 3, but not identical. Maximum eye movement to the right of the point 18 in FIG. 4, as described in connection with FIG. 3, before a gap develops, is only 6.35 cm. A bright band appears similar to the bright band 34 in FIG. 3, and no movement to the left can occur without a gap developing. The range of permitted eye movement can be increased by increasing the radius of curvature of the mirror 20 but at the expense of reducing the FOV of the second display device.

Figure 5:
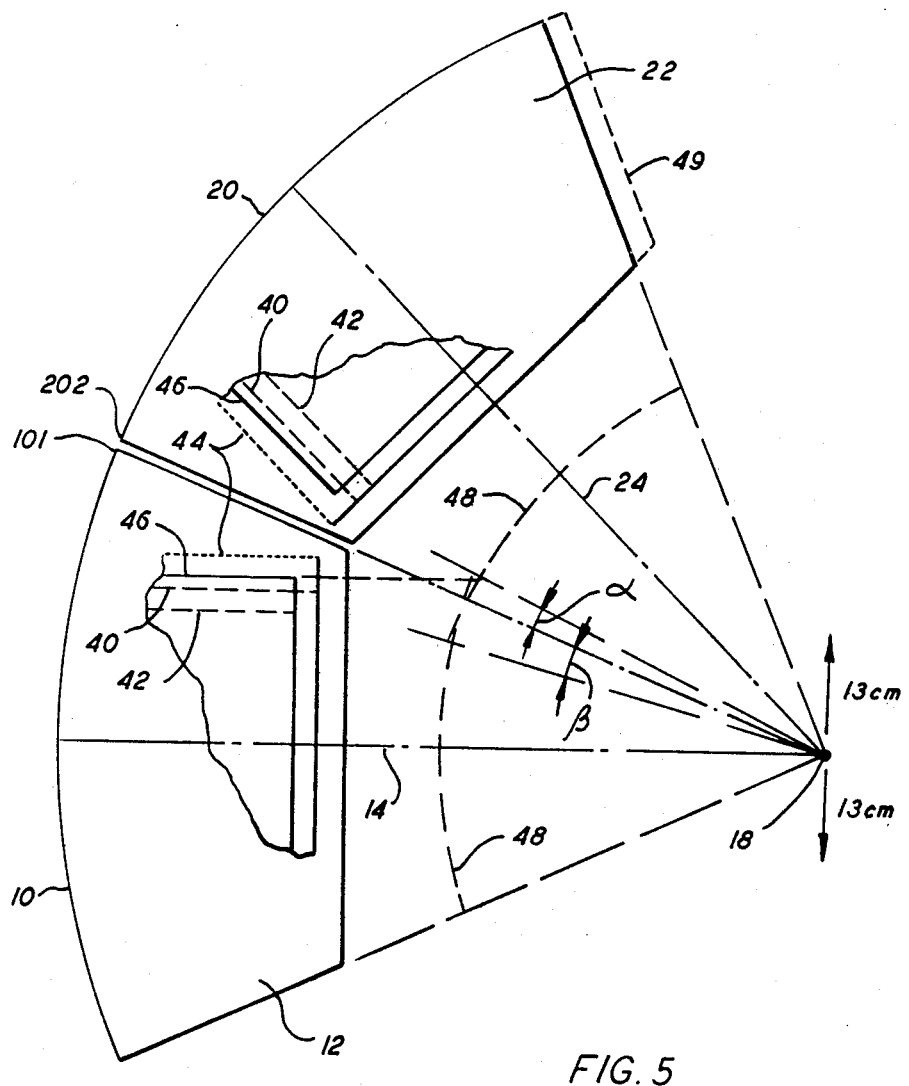
FIG. 5 is a plan view of still another form of the invention.

In the embodiment shown in FIG. 5, the second display device has the normal orientation, and both CRTs are facing vertically down toward the plane of the paper as viewed in FIG. 5. The edges of the mirrors 10 and 20, i.e., the right hand edge 101 of the mirror 10 and the left hand edge 202 of the mirror 20, are attenuated, as are the corresponding edges of the beam splitters 12 and 22.

Two corners of the screens of the two CRTs are shown in the fragmentary manner in FIG. 5, the normal positions of the screen edges being shown by the broken lines 40, and the corresponding positions of the phosphor edges are shown by the broken lines 42. With these parts positioned as described, an eye at the point 18 will see a composite image with no visible gap, although there could be some actual discontinuity. A gap will develop, however, if the eye is moved off the point 18.

In accordance with the form of the present invention shown in FIG. 5, the CRTs have their axes tilted towards each other in planes perpendicular to the respective device axes 14 and 24 and about the respective centers of screen curvature (corresponding to point 27 in FIG. 1), so that the edges 40 of the CRT move to the dotted lines 44 and the phosphor edges 42 move to the full lines 46. If the angles of tilt are $\alpha$ and $\beta$, respectively, the CRT images overlap by $\alpha+\beta$, as is shown by the two overlapping arcs 48 representing the CRT images seen by the eye at the point 18.

The total horizontal FOV is now $2\times 45° - (\alpha+\beta)$, which is larger than is possible with the first two embodiments, which adds the elevation FOV ($34\frac{1}{2}°$) of the second display device to the azimuth FOV (46°) of the first display device. If $\alpha=\beta=5°$, the eye can move about 13 cm to either side of the ideal point 18 before any gap starts to develop.

Such movement can involve marginal loss of the extreme lateral edges of the composite FOV. Such loss can be avoided by small extensions of one of the mirrors, or if need be, to both of the mirrors and beam splitters, as indicated in broken lines 49 for the second display device.

The invention can be extended to more than two visual display devices to achieve an even wider field-of-view. Other modifications, variations and alterations will occur to one skilled in this art, and therefore, it is intended that the foregoing description be considered as illustrative only and that all such changes are within the true spirit of the invention, the scope of which is limited only by the following claims.

I claim:

1. A visual display arrangement for a simulator to develop improved realism in a projected scene as viewed by an observer, comprising:

first and second wide angle display devices in each of which the screen of a CRT is reflected into a concave mirror by a beam splitter through which the observer sees the image of the CRT screen in the mirror, the concave mirrors of the first and second display devices being positioned contiguously to form a composite visual display scene, and the CRT axis of at least one display device being so tilted that the CRT screen images as observed in the adjacent concave mirrors are substantially continuous.

2. The visual display arrangement for a simulator in accordance with claim 1, wherein said concave mirrors of said first and second display devices have abutting lateral edges.

3. The visual display arrangement for a simulator as set forth in claim 1, wherein the second display device is rotated 90° about its axis relative to the first display device, said rotated axis being so displaced from the axis of the first display device that the edge of the beam splitter of the first display device which is adjacent the concave mirror of the second display device is adjacent also a lateral edge of the concave mirror of the first display device.

4. The visual display arrangement for a simulator as set forth in claim 3, wherein edges of the two concave mirrors are positioned in abutting relationship.

5. The visual display arrangement for a simulator as set forth in claim 3, wherein the concave mirror of said second display device has a larger radius of curvature than the concave mirror of said first display device.

6. The visual display arrangement for a simulator as set forth in claim 1, wherein said CRT axis of at least one display device is tilted in the order of 5° so that the CRT screen images as observed in the two adjacent concave mirrors are substantially continuous.

7. The visual display arrangement for a simulator as set forth in claim 1, wherein the CRT axes of said first and said second display devices are so tilted that the CRTs screen images as observed in the two adjacent concave mirrors are substantially continuous.

8. The visual display arrangement for a simulator as set forth in claim 7, wherein the CRT axes of said first and said second display devices are tilted in the order of 5° so that the CRT screen images as observed in said concave mirrors are substantially continuous.

9. The visual display arrangement for a simulator as set forth in claim 3, wherein the CRT axes of said first and said second display devices are tilted in the order of 5° so that the CRT screen images are observed in said concave mirrors are substantially continuous.

10. The visual display arrangement for a simulator as set forth in claim 5, wherein the concave mirror having a larger radius of curvature and the concave mirror of said first display device are positioned, respectively, at different distances from the observer and are overlapped a predetermined amount, so that the CRT screen images as observed in said adjacent concave mirrors are substantially continuous.

* * * * *